(12) United States Patent
Robertson (10) Patent No.: US 9,856,863 B2
(45) Date of Patent: Jan. 2, 2018

(54) SHOCK ABSORBERS

(76) Inventor: Graeme Kershaw Robertson, Yandina (AU)

(*) Notice: Subject to any disclaimer, the term of this patent is extended or adjusted under 35 U.S.C. 154(b) by 48 days.

(21) Appl. No.: 13/816,241

(22) PCT Filed: Aug. 12, 2011

(86) PCT No.: PCT/AU2011/001023
§ 371 (c)(1),
(2), (4) Date: Sep. 13, 2013

(87) PCT Pub. No.: WO2012/019234
PCT Pub. Date: Feb. 16, 2012

(65) Prior Publication Data
US 2014/0017096 A1    Jan. 16, 2014

(30) Foreign Application Priority Data
Aug. 12, 2010  (AU) .................. 2010903608

(51) Int. Cl.
*F16F 9/34* (2006.01)
*F16F 9/36* (2006.01)
(Continued)

(52) U.S. Cl.
CPC .............. *F04B 7/00* (2013.01); *F16F 9/3228* (2013.01); *F16F 9/3242* (2013.01); *F16F 9/3405* (2013.01); *F16F 9/348* (2013.01)

(58) Field of Classification Search
CPC .. F16F 9/348; F16F 9/512; F16F 9/516; F16F 9/3485; F16F 9/5126; F16F 9/3405;
(Continued)

(56) References Cited

U.S. PATENT DOCUMENTS

| | | | | |
|---|---|---|---|---|
| 2,803,313 A | * | 8/1957 | Ulmann | F16F 9/512 137/538 |
| 3,781,943 A | * | 1/1974 | Cain | E05F 3/108 16/52 |

(Continued)

FOREIGN PATENT DOCUMENTS

| | | |
|---|---|---|
| JP | 3-67733 U | 7/1991 |
| JP | 2008248953 A | 10/2008 |
| JP | 2010071369 A | 4/2010 |

OTHER PUBLICATIONS

English translation of JP3-67733U.

*Primary Examiner* — Robert A. Siconolfi
*Assistant Examiner* — San Aung
(74) *Attorney, Agent, or Firm* — Charles H Jew (57) ABSTRACT

A damping unit, such as a shock absorber, includes a cylinder (2), a piston (4) dividing the cylinder into a compression chamber 6 and a rebound chamber (8), and a piston rod (10). The rod extends from the piston through at least the rebound chamber. The compression chamber reduces in volume and the rebound chamber increases in volume as the damping unit contracts generating a compression flow across the piston, and the rebound chamber reduces in volume and the compression chamber increases in volume as the damping unit extends, generating a rebound flow across the piston. The piston has a compression chamber piston face and an annular rebound chamber piston face. At least one rebound restriction is provided in or on the piston, such as one or more rebound ports (26)/passages/valving (28), and at least one compression restriction, such as one or more compression ports 14/passages/valving (20) is provided in or on the piston. The rod has at least one channel (36) in an outer surface of the rod extending along a portion of the length of the rod towards/into the piston such that at least a portion of the rebound flow across the piston flows (Continued)

from the rebound chamber, along said at least one channel, through the rebound restriction into the compression chamber.

19 Claims, 4 Drawing Sheets

(51) Int. Cl.
*F04B 7/00* (2006.01)
*F16F 9/32* (2006.01)
*F16F 9/348* (2006.01)

(58) Field of Classification Search
CPC .......... F16F 9/3214; F16F 9/34; F16F 9/0218; F16F 9/3228; F16F 9/49; F16F 9/0227; F16F 9/44; F16F 9/19; F16F 9/145; F16F 9/26; F16F 9/28; F16F 9/3415; F16F 9/3242; F04B 7/00
USPC ........... 188/322.15, 322.13, 282.1, 317, 312, 188/282.5, 282.6, 282.8, 282.9, 322.22; 251/48
See application file for complete search history.

(56) References Cited

U.S. PATENT DOCUMENTS

| | | | | |
|---|---|---|---|---|
| 4,110,868 A | * | 9/1978 | Imazaike | E05F 5/10 16/66 |
| 4,591,033 A | * | 5/1986 | Taylor | F16F 9/346 188/317 |
| 5,246,092 A | * | 9/1993 | Yamaoka | F16F 9/468 188/315 |
| 6,120,049 A | * | 9/2000 | Gonzalez | F16F 9/56 188/282.5 |
| 6,918,473 B2 | | 7/2005 | Deferme | |
| 7,040,468 B2 | | 5/2006 | Shinata | |
| 7,513,490 B2 | | 4/2009 | Robertson | |
| 2001/0042663 A1 | | 11/2001 | Marking et al. | |
| 2003/0047396 A1 | * | 3/2003 | Van Wonderen | F16F 9/466 188/282.1 |
| 2006/0266602 A1 | * | 11/2006 | Robertson | F16F 9/063 188/322.15 |
| 2008/0250844 A1 | * | 10/2008 | Gartner | F16F 9/3264 73/11.07 |
| 2009/0322054 A1 | * | 12/2009 | Becker | B62K 25/08 280/276 |
| 2010/0096229 A1 | * | 4/2010 | Azekatsu | F16F 9/5126 188/282.1 |

* cited by examiner

SHOCK ABSORBERS

FIELD OF THE INVENTION

The present invention is generally directed to motion damping and in particular to the flow path of fluid through piston valves of motion damping units, such as shock absorbers.

BACKGROUND OF THE INVENTION

Damping between two parts or bodies is often performed by a fluid filled ram or damping unit having a cylindrical bore or main body attached to one of the relatively moving parts and a rod attached to the other relatively moving part. The rod is attached to a piston running inside the bore and forming on one side a compression chamber which reduces in volume as the rod retracts and the damping unit compresses, and on the other side a rebound chamber which reduces in volume as the damping unit extends. The piston typically includes valving to control flow of fluid between the compression and rebound chambers. A common example is the telescopic "shock absorber" used between each wheel of a vehicle and its body to damp motions of the body and oscillations of the wheels. The fluid used as a damping medium can be a gas or a liquid such as hydraulic oil. There are two common constructions of hydraulic shock absorber, the mono tube which has a gas reservoir separated by a piston from the fluid in the compression chamber, or the twin tube in which the gas reservoir is located in a sleeve around the bore or piston cylinder and communicated with the compression chamber by a reservoir damper valve.

As the damping unit compresses, fluid flows from the compression chamber into the rebound chamber through the piston compression valving which uses holes and flexible shims to provide fluid restriction causing an increase in the fluid pressure in the compression chamber compared to the rebound chamber. These pressures acting over the piston generate a force opposing the compression motion, ie a compression damping force. Similarly, as the damping unit extends, fluid flows from the rebound chamber into the compression chamber through the piston rebound valving which uses a different set of holes and flexible shims to generate a rebound damping force.

In hydraulic shock absorbers the damping forces are generally dependent on the velocity of the rod motion relative to the piston cylinder, whereas with a gas filled shock absorbers, the damping forces are also frequency dependent.

In conventional shock absorber designs, the area of piston face used to accommodate the piston compression valving is similar or even the same as the area of piston face used to accommodate the piston rebound valving. However the compression and rebound damping forces required are rarely the same, with rebound commonly three times higher than compression damping force to limit input of large forces into the vehicle body structure. Also the effective area of the piston face in the compression chamber is larger than the effective area of the piston face in the rebound chamber. As a result, the area of holes providing a significant element of the damping force are usually much smaller in the rebound valving than in the compression valving.

This fundamental imbalance in piston valving area required in compression compared to rebound is addressed in the applicant's earlier U.S. Pat. No. 7,513,490 in which the compression and rebound flows are radially separated. Compression flow passes through an outer ring of holes and past large diameter flexible shims into the rebound chamber. Rebound flow passes from the rebound chamber through radial holes into a passage inside the rod of the damping unit and on into a central chamber inside the piston, from which one or more rebound damping holes (inside the outer ring of compression damping holes) permit flow into the compression chamber past small diameter flexible shims. This design inherently provides a larger flow area and lower damping force in compression than in rebound motions, as is typically required.

All of the above described shock absorbers are pressurised in use, and as the rod only extends through the rebound chamber giving a large effective piston face area on the compression chamber side, this pressure acts on the rod area to provide a force tending to extend the rod out of the damping unit (also known as a "push-out" force).

In the applicant's prior US patent, the use of a passage inside the rod typically increases the minimum rod diameter, which in turn increases the push out force. Although some push-out force is typically present as noted above, the primary function of the shock absorber is to provide damping. Increasing the push out force can alter the characteristics of the unit for example in light vehicles and/or with temperature changes and can make the units difficult to install in vehicles.

It would therefore be desirable to provide a damping unit having radially separated compression and rebound piston flows in which the minimum rod diameter can be reduced.

It would also be desirable to provide an improved construction of gas reservoir for a mono-tube hydraulic damping unit.

SUMMARY OF THE INVENTION

With the aforementioned in view, the present invention provides in one aspect a damping unit including a cylinder, a piston dividing the cylinder into a compression chamber and a rebound chamber, and a rod with an outer surface and a length, the rod extending from the piston through at least the rebound chamber, the compression chamber reducing in volume and the rebound chamber increasing in volume as the damping unit contracts generating a compression flow across the piston, the rebound chamber reducing in volume and the compression chamber increasing in volume as the damping unit extends, generating a rebound flow across the piston, the piston having a compression chamber piston face and an annular rebound chamber piston face, at least one rebound restriction is provided in or on the piston, and at least one compression restriction is provided in or on the piston, wherein the rod includes at least one channel in the outer surface of the rod, said at least one channel extending along a portion of the length of the rod towards/into the piston such that at least a portion of the rebound flow across the piston flows from the rebound chamber, along said at least one channel, through the rebound restriction into the compression chamber.

Either or both of the rebound restriction and the compression restriction may include (individually or in combination) at least one orifice, at least one flexible disc and/or a sprung plate. A compression or rebound restriction acts to restrict fluid flow through the piston during the respective compression or rebound stroke/movement.

Another aspect of the present invention provides a damping unit including a cylinder, a piston dividing the cylinder into a compression chamber and a rebound chamber, and a rod with an outer surface and a length, the rod extending from the piston through at least the rebound chamber, the compression chamber reducing in volume and the rebound chamber increasing in volume as the damping unit contracts generating a compression flow across the piston, the rebound chamber reducing in volume and the compression chamber increasing in volume as the damping unit extends, generating a rebound flow across the piston, the piston having a compression chamber piston face and an annular rebound chamber piston face, rebound valving is located on the compression chamber piston face, and compression valving is located on the annular rebound chamber piston face, wherein the rod includes at least one channel in the outer surface of the rod, said at least one channel extending along a portion of the length of the rod towards/into the piston such that at least a portion of the rebound flow across the piston flows from the rebound chamber, along said at least one channel, through the rebound valving into the compression chamber.

The rebound valving may include at least one rebound valve port arranged on the compression chamber piston face and at least one rebound valve disc located adjacent the compression chamber piston face. The at least one rebound valve port may be connected to said at least one channel in the outer surface of the rod such that rebound flow across the piston passes from the rebound chamber, along said at least one channel, through said at least one rebound valve port, around the at least one rebound valve disc into the compression chamber. The at least one channel in the outer surface of the rod may be connected to the at least one rebound valve port by a rebound void inside the piston.

Substantially all of the rebound flow across the piston may flow through said at least one channel in the outer surface of the rod.

The compression valving may include an outer ring of compression valve ports arranged around the annular rebound chamber piston face and at least one compression valve disc located adjacent the annular rebound chamber piston face. The compression valve ports may be connected to the compression chamber through the compression chamber piston face such that compression flow across the piston passes from the compression chamber through the compression valve ports, around the at least one compression valve disc into the rebound chamber.

The at least one rebound port may be radially separated from the outer ring of compression ports such that the rebound flow across the piston is radially separated from the compression flow across the piston.

Substantially all of the compression flow across the piston may flow through said outer ring of compression ports.

The at least one rebound port may be radially separated from the outer ring of compression ports such that the rebound flow across the piston is radially separated from the compression flow across the piston.

Alternatively the compression valving may include an outer ring of compression valve ports arranged around the annular rebound chamber piston face and at least one compression valve disc and the rebound valving may include at least one rebound valve port arranged on the compression chamber piston face and at least one rebound valve disc. The at least one rebound port may be radially separated from the outer ring of compression ports such that the rebound flow across the piston is radially separated from the compression flow across the piston. The compression flow across the piston may be limited to flow from the compression chamber through the compression valve ports, around the at least one compression valve disc into the rebound chamber, and the rebound flow across the piston may be limited to flow from the rebound chamber, along the at least one channel on the periphery of the rod, into a rebound void inside the piston, then through the at least one rebound valve port, around the at least one compression valve disc into the compression chamber.

In one or more forms of the present invention, the compression and rebound chambers may be filled with a liquid (such as hydraulic oil). Then the damping unit may further include a reservoir including a moveable member dividing the reservoir into a gas volume and a liquid volume. The reservoir may be connected to a cylinder end cap, the cylinder end cap being fixed to the cylinder to close the end of the compression chamber, the liquid volume of the reservoir being in fluid communication with the compression chamber. The reservoir may be located inside one end of the cylinder.

A further aspect of the present invention provides a method of controlling flow through a piston of a damping unit, the damping unit including a cylinder, a piston dividing the cylinder into a compression chamber and a rebound chamber, and a rod extending from the piston through at least the rebound chamber, the compression chamber reducing in volume and the rebound chamber increasing in volume as the shock absorber assembly contracts generating a compression flow across the piston, the rebound chamber reducing in volume and the compression chamber increasing in volume as the shock absorber extends, generating a rebound flow across the piston, the piston having a compression chamber piston face and an annular rebound chamber piston face, the method including the steps of:

radially separating the rebound and compression flows across the piston by providing at least one rebound port in a rebound port area on the compression chamber piston face and by providing at least one compression port in a compression port area on the compression chamber piston face, the compression port area being larger than the rebound port area and radially spaced outside the rebound port area; and using at least one channel along a portion of the outer surface of the rod to allow fluid to flow from the rebound chamber to the at least one rebound port.

In this case, preferably substantially none of the rebound flow across the piston flows through ports in the annular rebound chamber piston face.

This method of controlling the flow through a piston of a damping unit provides a larger compression flow area than rebound flow area (and a corresponding lower pressure drop in the compression direction through the valve) while using a smaller rod diameter and overall package size than conventional methods. This provides a more efficient design in terms of space (diameter and/or length) and material usage.

The method may further include providing differing types of restrictions to enable additional control of the flow through the piston to provide the desired force vs velocity or force vs acceleration characteristics. For example, the method may include providing (individually or in combination) at least one orifice, at least one flexible disc and/or a sprung plate in a path of the rebound flow and/or in a path of the compression flow.

Another aspect of the invention provides a damping unit including a cylinder, a piston dividing the cylinder into a compression chamber and a rebound chamber and a rod extending from the piston through at least the rebound chamber, the compression and rebound chambers being filled with a liquid such as a hydraulic oil. To accommodate the changing rod volume within the cylinder as the damping unit extends and contracts, a reservoir is provided including a moveable member dividing the reservoir into a gas volume and a liquid volume. The reservoir may (wholly or in part) be located inside one end of the cylinder, the liquid volume of the reservoir being in fluid communication with the compression chamber. The reservoir may be connected to a cylinder end cap, the cylinder end cap being fixed to the cylinder to close the end of the compression chamber.

The invention will be more readily understood from the following description of a damping unit piston and assembly incorporating one or more features of the invention, and as illustrated in the accompanying drawings. Other arrangements or embodiments are possible, so the provision of the accompanying drawings and the following description thereof should not be taken to limit the scope of the above description of the invention.

DESCRIPTION OF PREFERRED EMBODIMENT

Figure 1:
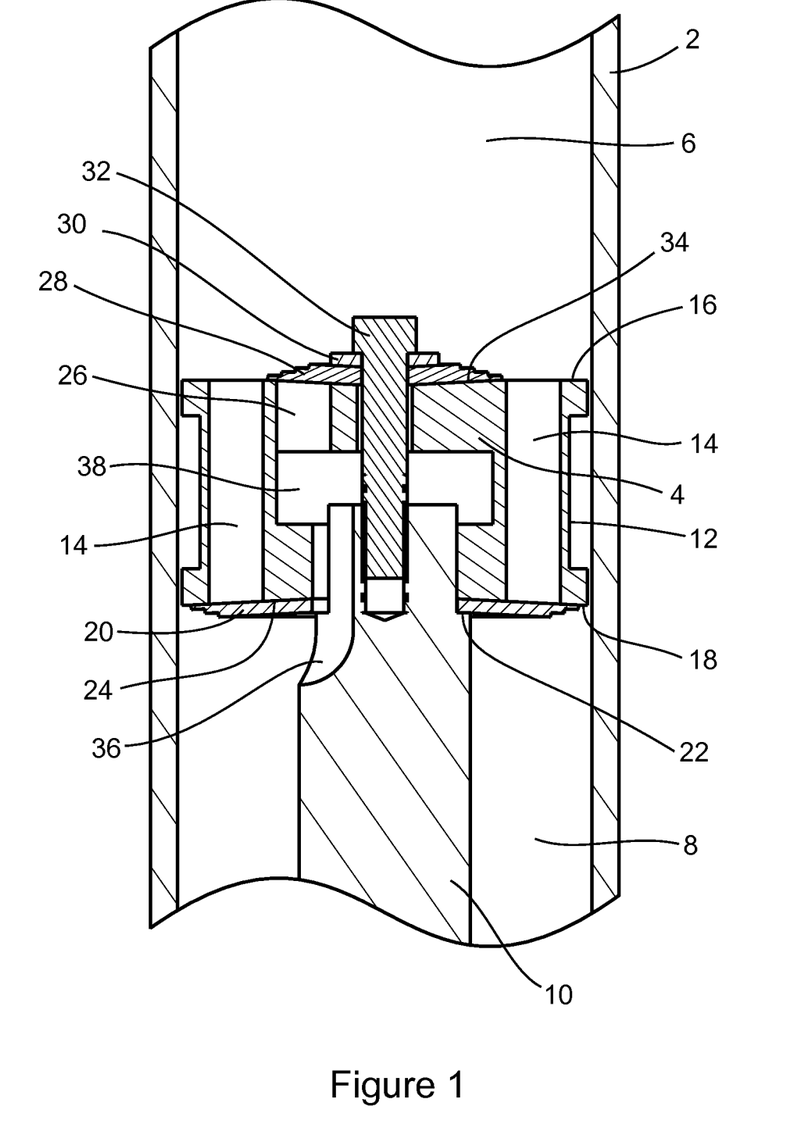
FIG. 1 is a detailed cross-sectional view of a piston in a damping unit.

Referring initially to FIG. 1, the piston region of a damping unit (in this example, of a type commonly known as a shock absorber) is shown. In the damping unit a cylinder 2 houses a piston 4 dividing the cylinder into a compression chamber 6 and a rebound chamber 8. A rod 10 extends from the piston 4 into the rebound chamber 8.

A groove 12 around the outer face of the piston indicates the position of a bearing and sealing ring or band (not shown). In operation, the piston slides axially inside the bore of the cylinder 2, but the radial bearing load can vary significantly depending on application. For example, if the ends of the cylinder and rod (where the damping unit is mounted between two objects requiring damping of their relative motion) are effectively ball joints, so there is no bending moment on the rod, then the radial bearing loads are low. Conversely, in a monotube McPherson strut automobile shock absorber application, the bending moment on the rod can be very high, so a bearing and separate seal may be used on the outer of the piston between the piston and the cylinder. Also depending on the application and the piston valving used, flow around the piston 4 (past the seal/bearing in groove 12) which effectively bypasses the controlled piston valving can be acceptable with a simple band of bearing material, or in other cases can lead to variations in performance requiring a separate seal.

Figure 2:
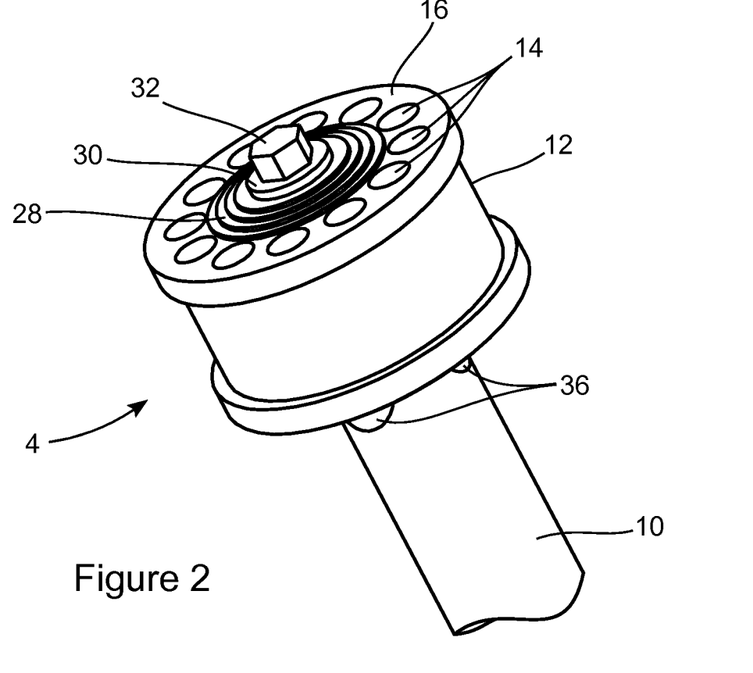
FIG. 2 is a perspective view of the piston in FIG. 1.

Compression ports 14 through the piston (4, also known as a valve body) permit flow through the piston from the compression chamber 6 to the rebound chamber 8. As can be seen in FIG. 2, there is a ring of 12 such compression ports in a ring towards the outer of the top face of the piston (ie the compression chamber piston face 16), although any number can be used and the ports can be other shapes such as oval or slotted rather than the round drilled holes shown. Also the holes can vary in cross section. In FIG. 1 the holes are shown having a uniform cross section, but if for example a higher restriction is required, the lower ends of the holes where the ports pass through the bottom face of the piston (i.e. the annular rebound chamber piston face 18) can be left a smaller diameter for a short length to provide a point restriction (i.e. increase damping without providing a significant increase in fluid acceleration effects which would cause phase lag).

The exit of each compression port 14 (through the annular rebound chamber piston face) is covered by a compression valve disc pack 20. Usually compression valve disc packs comprise a number of flexible discs of similar and different diameters to control the stiffness of the disc pack, but in FIG. 1 the compression valve disc pack is shown as a single stepped diameter item since the discs are usually very thin being measured in tenths of a millimeter. The disc pack is clamped to the piston by a shoulder 22 on the rod. A compression force acting on the cylinder and rod to compress (or contract) the damping unit generates an increase in pressure in the compression chamber, which deflects the compression valve disc pack, opening a gap around the disc pack to the lower end of the compression port 14 allowing fluid to flow from the compression chamber to the rebound chamber. The restriction from the compression port 14 and the disc gap generates the tuneable restriction which controls the pressure in the compression chamber and helps to provide the compression damping force. The annular rebound chamber piston face 18 has a concave section 24 (i.e. the compression valve concave seat) into which the compression valve disc pack is deflected by the clamping force of the rod. This can be used to provide a pre-load to the disc pack as shown. Some pre-load is desirable for repeatable performance of the damping unit both over time and from one unit to the next. There are other known methods of providing a pre-load which can be interchanged in the design, such as a small raised ring around the outside of the compression ports on the annular rebound chamber piston face onto which the compression valve disc pack seats at rest.

The principle behind the rebound valving is the same as the compression valving in that at least one rebound port 26 is closed at its exit by a rebound valve disc pack 28 (again represented by a single stepped diameter item in FIG. 1 as the individual discs used are too thin to meaningfully display). The rebound valve disc pack 28 is clamped to the piston 4 by a washer 30 and bolt 32. Again the disc pack is deflected, in this case into a concave section 34 (i.e. the rebound valve concave seat) in the compression chamber piston face 16, although other known arrangement can be used. The rebound valving is located inside the (outer) ring of compression ports.

Figure 3:
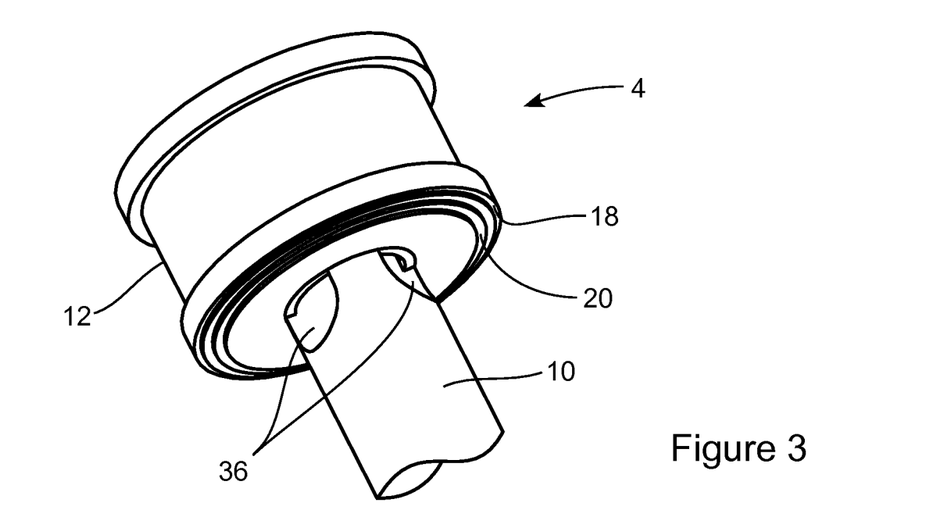
FIG. 3 is a perspective view of the piston in FIGS. 1 and 2.

A groove or channel 36 is cut or formed in the outer surface of the rod to allow fluid from the rebound chamber to flow inside the compression valving, up inside the piston. A radial cut at the end of the rod inside the piston forms a rebound void 38 which connects the channel 36 to the rebound port 26. As can be seen in FIG. 3 looking at the underside of the piston (valve body) 4, multiple grooves or channels 36 can be provided (in this case three, although the number can be one or more) communicating the rebound chamber 8 with the rebound void 38, which in turn connects to the at least one rebound port 26. Again the number of rebound ports and their shape can be varied to produce the required restriction. For example 3 or more rebound ports can be used.

So the operation in rebound is similar to compression, but utilising different flow paths. As a force is applied to move the rod and cylinder apart and extend the damping unit, pressure is generated in the rebound chamber which acts to deflect the rebound valve disc pack and causing fluid to flow from the rebound chamber along the channel 36 through the rebound void 38 and rebound port(s) 26, past the deflected rebound valve disc pack 28 into the compression chamber. This controls the restriction and therefore the pressure in the rebound chamber due to extension motion of the damping unit, helping to provide the rebound damping force.

The rod 10 can be threaded into the piston 4 in addition to the use of the bolt 32 clamping the rebound valving to the piston and the piston to the rod.

In the example illustrated, the flow path of fluid through the piston in compression is radially separated from the flow path of fluid through the piston in rebound, with the compression flow and valving using an area outside the rebound flow.

Figure 4:
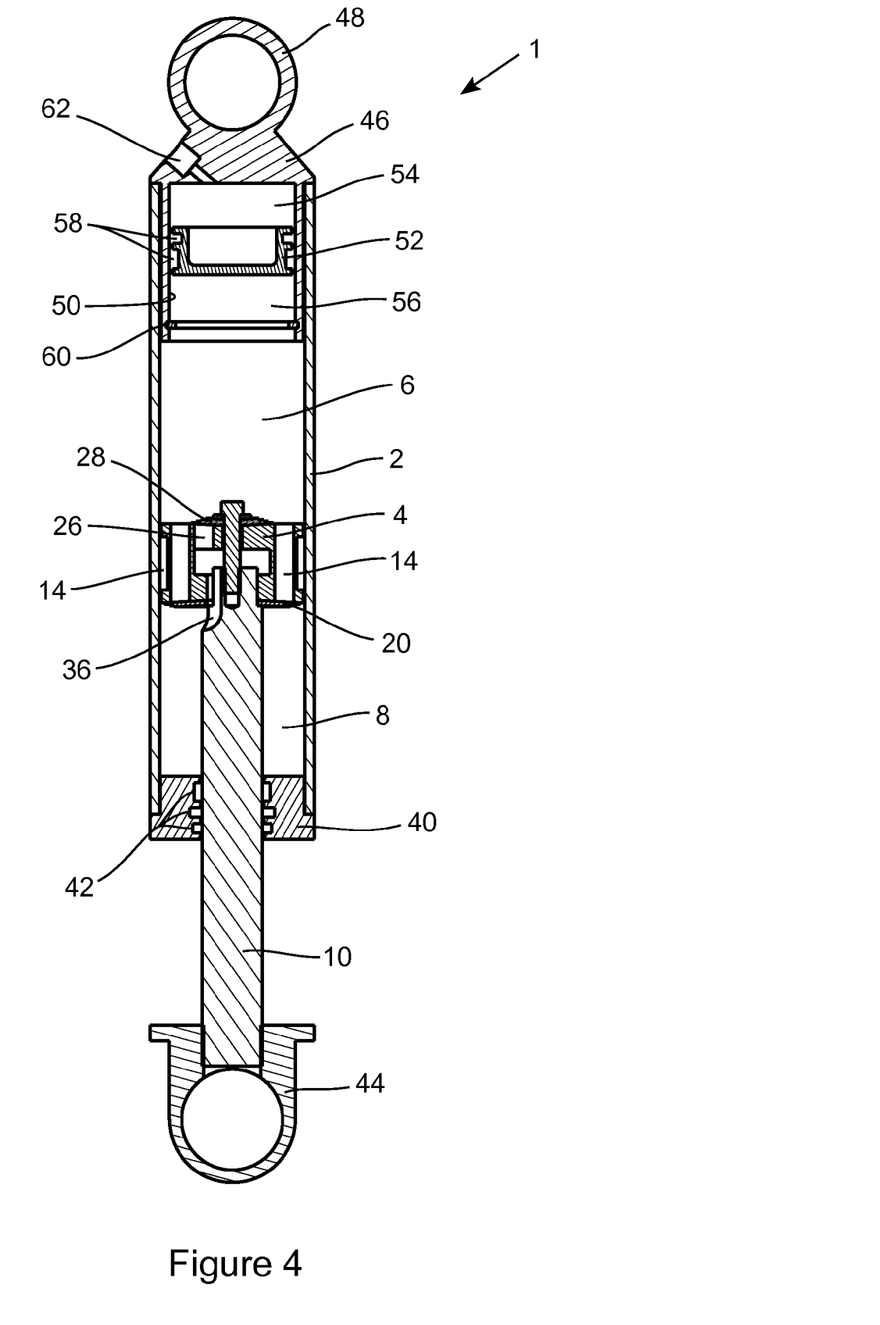
FIG. 4 is a cross-sectional view of a damping unit according to at least one aspect of the present invention.

FIG. 4 shows a section through a damping unit 1 having the piston and rod shown in FIGS. 1 to 3. Again, the damping unit illustrated is of the type commonly known as a shock absorber. The lower end of the rebound chamber is closed by a cylinder rebound end cap 40 which is fixed and sealed to the cylinder 2. The rod 10 extends through the cylinder rebound end cap 40 past a number of radial seals, bearings and/or bands (not shown) held in grooves 42 in the rebound end cap. The end of the rod has a bushing sleeve 44 fixed to the end, used as one of the actuating mounts for the damping unit. The bushing sleeve can hold an outer dust sleeve around the cylinder, provide a face to actuate a compression stop and other known features.

The upper end of the compression chamber in FIG. 4 is closed by a cylinder compression end cap 46. A bushing sleeve 48 is fixed to or formed into the end of the cylinder compression end cap for use as the other actuating mount for the damping unit, although other positions and types of cylinder mount can be used.

As the damping unit extends (i.e. as the rod protrudes further out of the rebound chamber end of the cylinder, increasing the distance between the bushing sleeve 48 on the cylinder and the bushing sleeve 44 on the rod) the compression chamber increases in volume and the rebound chamber reduces in volume, generating a rebound flow across the piston. So, any pressure drop across the piston generates a rebound force as the damping unit extends. Conversely as the damping unit contracts, the compression chamber reduces in volume and the rebound chamber increases in volume, generating a compression flow across the piston. So, any pressure drop across the piston generates a compression damping force as the damping unit contracts.

If the compression chamber 6 and rebound chamber 8 are filled with hydraulic oil, some compliance is required to absorb the rod volume changes caused by compression and extension of the damping unit 1. The bore 50 of a reservoir unit is fixed to or built into the cylinder compression end cap 46. A reservoir piston 52 is shown inside the reservoir bore 50 to separate the gas volume 54 to the liquid volume 56 of the reservoir, although other movable or deformable dividing members (such as bladders) can be used. The liquid volume 56 is in direct communication with the compression chamber of the damping unit, although additional damper valving can be provided between the liquid volume 56 and compression chamber 6.

The reservoir piston 52 slides inside the reservoir bore 50, but needs to seal gas from liquid, so grooves 58 are shown to receive seals and bearings (not shown). A circlip 60 is shown in the lower end of the reservoir bore to retain the reservoir piston within the bore. The piston is hollow to increase the gas volume. A charge point 62 for the gas in the reservoir is shown in the cylinder compression end cap.

This construction of reservoir is an improvement over conventional mono-tube shock absorber designs as it allows the reservoir to be manufactured and tested, then easily assembled into the damping unit. It also allows damping to be provided between the reservoir and the compression chamber of the damping unit. The length of such a damping unit does not need to increase over conventional mono-tube designs, and the design can replace external reservoir designs in many applications.

Figure 5:
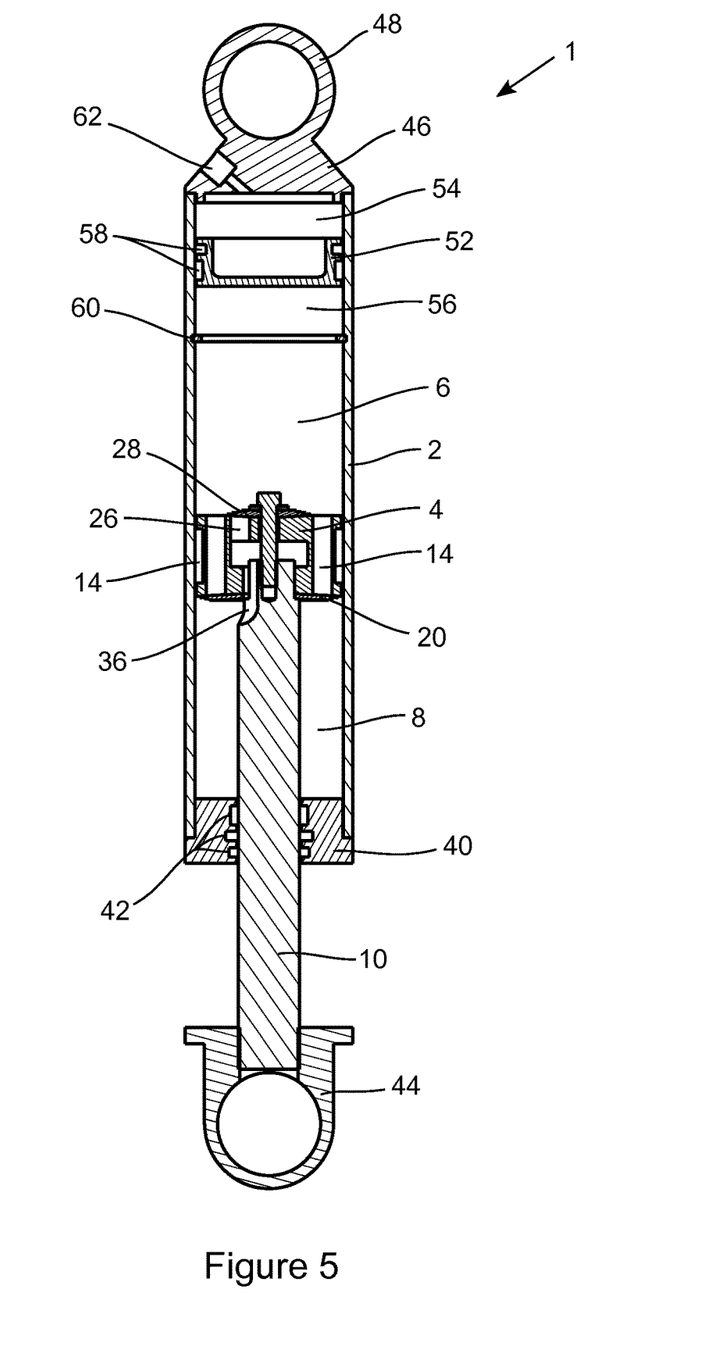
FIG. 5 is a cross-sectional view of a damping unit where the reservoir unit is not fully integrated into the cylinder compression end cap.

FIG. 5 shows a similar damping unit (1) to the unit in FIG. 4. However in FIG. 5, the reservoir unit is not fully integrated into the cylinder compression end cap. Instead, the reservoir piston 52 slides inside the same bore (of cylinder 2) as the damper piston 4. A groove is provided in the bore of the cylinder 2 to retain the circlip 60 which is in turn provided to retain the reservoir piston within the region of the cylinder 2 intended as the reservoir (as opposed to the region swept by the piston 4 of the damping unit) i.e. the circlip separates (or is in a region between) the reservoir region of the damping unit in which the reservoir piston (52) moves and the compression (and rebound) region of the damping unit in which the damping piston (4) moves.

Alternative valve structures such as different styles of valve discs including very low speed (bleed) discs, insert plates used to control the high speed restrictions of the compression and/or rebound ports (to provide a point restriction and minimise phase lag due to fluid mass acceleration effects), "twin bleed" designs (usually two stages of bleed discs of different flow areas and at different diameters) and springs used to control the higher speed characteristics are all compatible with the present invention and their use in combination with the claimed features is considered to be within the scope of the present invention.

The invention claimed is:

1. A damping unit including a cylinder, a piston dividing the cylinder into a compression chamber and a rebound chamber, the damping unit containing hydraulic fluid in the compression chamber and in the rebound chamber, and a rod with an outer surface and a length, the rod extending from the piston through at least the rebound chamber, the compression chamber reducing in volume and the rebound chamber increasing in volume as the damping unit contracts generating a compression flow of said hydraulic fluid across the piston from the compression chamber to the rebound chamber, the rebound chamber reducing in volume and the compression chamber increasing in volume as the damping unit extends, generating a rebound flow of said hydraulic fluid across the piston from the rebound chamber to the compression chamber, the piston having a compression chamber piston face and an annular rebound chamber piston face, rebound valving is located on the compression chamber piston face, and compression valving is located on the annular rebound chamber piston face, and wherein the rod extends only partially into the piston such that an end of the rod is inside the piston and includes at least one channel cut or formed in the outer surface of the rod, said at least one channel providing the only rebound flow porting from the rebound chamber and extending along a portion of the length of the outer surface of the rod and into the piston such that substantially all of the rebound flow across the piston during all rebound movements of the piston flows from the rebound chamber, flowing into the piston from said at least one channel of the rod, and the rebound flow exiting the piston, along said at least one channel, through the rebound valving into the compression chamber.

2. A damping unit according to claim 1 wherein the rebound valving includes at least one rebound valve port arranged on the compression chamber piston face and at least one rebound valve disc located adjacent the compression chamber piston face, said at least one rebound valve port being connected to said at least one channel in the outer surface of the rod such that rebound flow across the piston passes from the rebound chamber, along said at least one channel, through said at least one rebound valve port, around the at least one rebound valve disc into the compression chamber.

3. A damping unit as claimed in claim 2 wherein the at least one channel in the outer surface of the rod is connected to said at least one rebound valve port by a rebound void inside the piston.

4. A damping unit as claimed in claim 1 wherein the compression valving includes an outer ring of compression valve ports arranged around the annular rebound chamber piston face and at least one compression valve disc located adjacent the annular rebound chamber piston face, said compression valve ports being connected to the compression chamber through the compression chamber piston face such that compression flow across the piston passes from the compression chamber through the compression valve ports, around the at least one compression valve disc into the rebound chamber.

5. A damping unit according to claim 2 wherein the at least one rebound port is radially separated from the outer ring of compression ports such that the rebound flow across the piston is radially separated from the compression flow across the piston.

6. A damping unit as claimed in claim 4 wherein substantially all of the compression flow across the piston flows through said outer ring of compression ports.

7. A damping unit according to claim 5 wherein the at least one rebound port is radially separated from the outer ring of compression ports such that the rebound flow across the piston is radially separated from the compression flow across the piston.

8. A damping unit according to claim 1 wherein the compression valving includes an outer ring of compression valve ports arranged around the annular rebound chamber piston face and at least one compression valve disc and the rebound valving includes at least one rebound valve port arranged on the compression chamber piston face and at least one rebound valve disc, and wherein the at least one rebound port is radially separated from the outer ring of compression ports such that the rebound flow across the piston is radially separated from the compression flow across the piston, said compression flow across the piston is limited to flow from the compression chamber through the compression valve ports, around the at least one compression valve disc into the rebound chamber, and said rebound flow across the piston is limited to flow from the rebound chamber, along the at least one channel on the periphery of the rod, into a rebound void inside the piston, then through the at least one rebound valve port, around the at least one compression valve disc into the compression chamber.

9. A damping unit according to claim 1 wherein the compression and rebound chambers are filled with the hydraulic fluid, the damping unit further including a reservoir including a moveable member dividing the reservoir into a gas volume and a reservoir hydraulic fluid volume, the reservoir being connected to a cylinder end cap, the cylinder end cap being fixed to the cylinder to close the end of the compression chamber, the reservoir hydraulic fluid volume being in fluid communication with the compression chamber.

10. A method of controlling flow through a piston of a damping unit, the damping unit including a cylinder, a piston dividing the cylinder into a compression chamber and a rebound chamber, the damping unit containing hydraulic fluid in the compression chamber and in the rebound chamber, and a rod with an outer surface and a length, extending from the piston through the rebound chamber, the compression chamber reducing in volume and the rebound chamber increasing in volume as the damping unit contracts generating a compression flow of said hydraulic fluid across the piston from the compression chamber to the rebound chamber, the rebound chamber reducing in volume and the compression chamber increasing in volume as the damping unit extends, generating a rebound flow of said hydraulic fluid across the piston from the rebound chamber to the compression chamber, the piston having a compression chamber piston face and an annular rebound chamber piston face, the method including the steps of:

radially separating the rebound and compression flows across the piston by providing at least one rebound port in a rebound port area on the compression chamber piston face and by providing at least one compression port in a compression port area on the compression chamber piston face, the compression port area being larger than the rebound port area and radially spaced outside the rebound port area; and using at least one channel cut or formed along a portion of the outer surface of the rod, said at least one channel providing the only rebound flow porting from the rebound chamber and extending along a portion of the length of the outer surface of the rod partially into the piston, such that an end of the rod is inside the piston, to allow substantially all of the rebound flow across the piston during all rebound movements of the piston to flow from the rebound chamber, along said at least one channel to flow from the at least one channel and into the piston, exiting the piston through the rebound valving and into the compression chamber.

11. A damping unit according to claim 3 wherein the at least one rebound port is radially separated from the outer ring of compression ports such that the rebound flow across the piston is radially separated from the compression flow across the piston.

12. A damping unit according to claim 1 wherein the at least one rebound port is radially separated from the outer ring of compression ports such that the rebound flow across the piston is radially separated from the compression flow across the piston.

13. A damping unit according to claim 4 wherein the at least one rebound port is radially separated from the outer ring of compression ports such that the rebound flow across the piston is radially separated from the compression flow across the piston.

14. A damping unit according to claim 6 wherein the at least one rebound port is radially separated from the outer ring of compression ports such that the rebound flow across the piston is radially separated from the compression flow across the piston.

15. A damping unit according to claim 1 wherein the rebound valving includes at least one rebound valve port and at least one rebound valve disc, at least one of the at least one rebound valve port providing a respective rebound flow restriction to the flow of hydraulic fluid during rebound movement of the piston within the cylinder.

16. A damping unit according to claim 15 wherein each of the at least one rebound valve port provides the respective rebound flow restriction.

17. A damping unit according to claim 9, wherein the reservoir is located inside one end of the cylinder.

18. A damping unit according to claim 9 wherein the reservoir is located around the cylinder.

19. A damping unit according to claim 9 wherein the reservoir is mounted externally to the cylinder.

\* \* \* \* \*